(12) United States Patent
Walstad

(10) Patent No.: US 12,501,884 B2
(45) Date of Patent: Dec. 23, 2025

(54) BIRD FEEDING SYSTEM

(71) Applicant: SWISSINNO SOLUTIONS AG, St. Gallen (CH)

(72) Inventor: Dennis Walstad, Elburn, IL (US)

(73) Assignee: SWISSINNO SOLUTIONS AG, St. Gallen (CH)

( * ) Notice: Subject to any disclaimer, the term of this patent is extended or adjusted under 35 U.S.C. 154(b) by 0 days.

(21) Appl. No.: 18/270,382

(22) PCT Filed: Jan. 5, 2021

(86) PCT No.: PCT/EP2021/050085
§ 371 (c)(1),
(2) Date: Jun. 29, 2023

(87) PCT Pub. No.: WO2022/148530
PCT Pub. Date: Jul. 14, 2022

(65) Prior Publication Data
US 2024/0081295 A1    Mar. 14, 2024

(51) Int. Cl.
*A01K 39/012*    (2006.01)
(52) U.S. Cl.
CPC .................................. *A01K 39/012* (2013.01)
(58) Field of Classification Search
CPC .................................................... A01K 39/012
See application file for complete search history.

(56) References Cited

U.S. PATENT DOCUMENTS

| | | | | |
|---|---|---|---|---|
| 4,215,652 A * | 8/1980 | Kerscher | ............... | A01K 39/012 119/57.8 |
| 4,829,934 A * | 5/1989 | Blasbalg | ............... | A01K 39/012 D30/127 |
| 6,450,120 B1 * | 9/2002 | Nylen | ................... | A01K 39/012 119/52.2 |
| 2005/0000459 A1 | 1/2005 | Buhl et al. | | |
| 2008/0127902 A1 | 6/2008 | Bent N et al. | | |
| 2008/0156269 A1 * | 7/2008 | Greenwood | ......... | A01K 39/012 119/51.01 |
| 2009/0255475 A1 | 10/2009 | Black | | |
| 2009/0260576 A1 | 10/2009 | Vosbikian | | |
| 2014/0261200 A1 | 9/2014 | Tu et al. | | |
| 2021/0127642 A1 * | 5/2021 | Tuthill | ................... | A01K 39/04 |
| 2022/0256816 A1 * | 8/2022 | Woods | ................. | A01K 39/012 |

FOREIGN PATENT DOCUMENTS

WO            1984002056 A1      6/1984

OTHER PUBLICATIONS

International Search report for PCT/EP2021/050085, prepared by the European Patent Office, mailing date Oct. 7, 2021, 4 pages.

* cited by examiner

*Primary Examiner* — Kimberly S Berona
*Assistant Examiner* — Katherine June Walter
(74) *Attorney, Agent, or Firm* — Brooks Kushman P.C.

(57) ABSTRACT

A bird feeding system, which is characterized by the fact that it prevents birds using the bird feeding system from scattering or dropping food on the ground by catching scattered or dropped feed in a tray and rendering it inaccessible to the birds.

16 Claims, 4 Drawing Sheets

BIRD FEEDING SYSTEM

CROSS-REFERENCE TO RELATED APPLICATION

Figure 1:
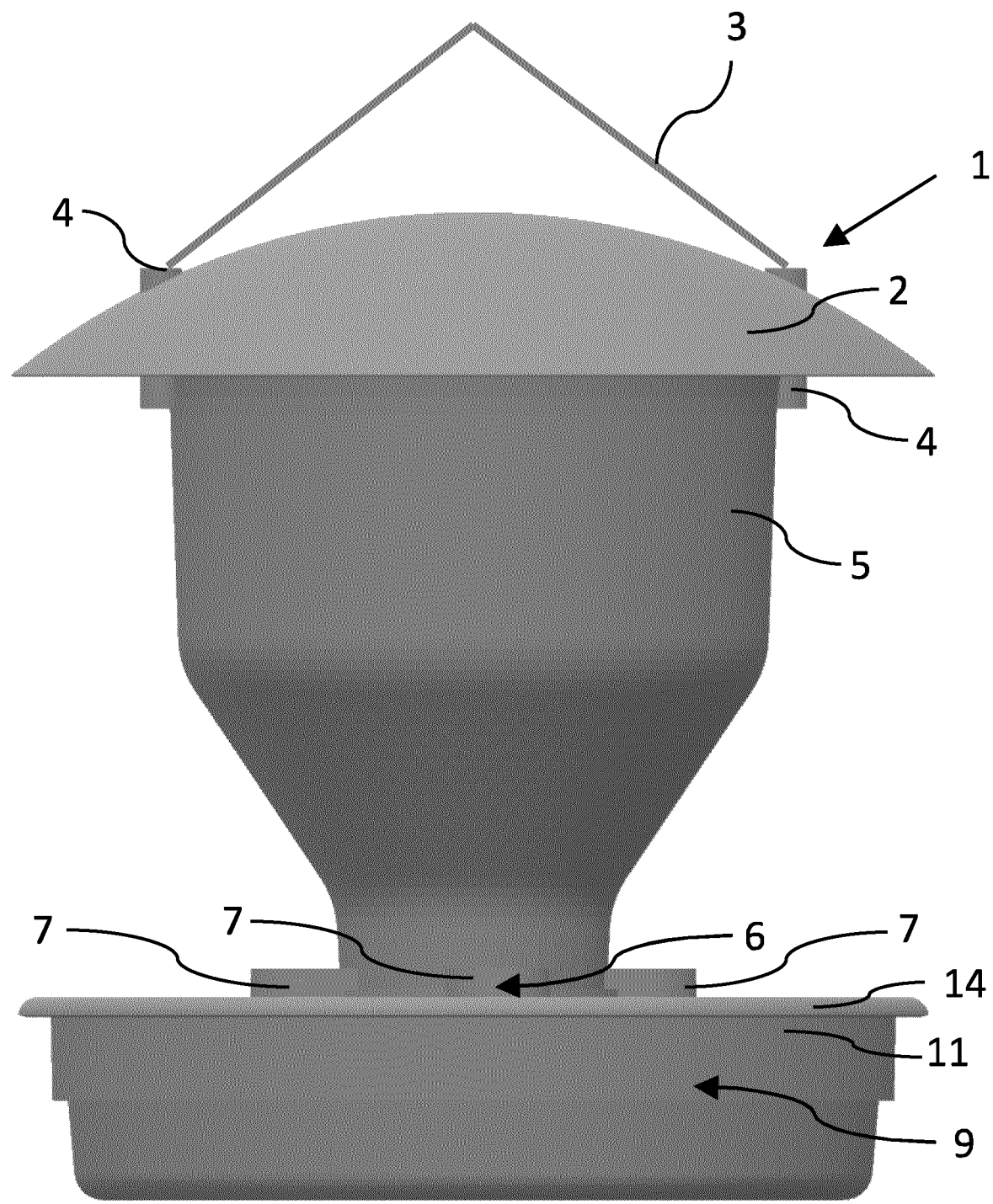

This application is the U.S. national phase of PCT Application No. PCT/EP2021/050085 filed on Jan. 5, 2021, the disclosure of which is incorporated in its entirety by reference herein.

The invention concerns a bird feeding system which ensures that the scattered or dropped feed does not fall on the ground but is collected in a tray without being accessible to the birds preventing them from scattering or dropping the feed further.

Bird feeding systems are generally known in the art and are used to feed and attract wild birds. Those feeding systems use feed to attract the birds.

The bird feeding systems are typically stored outside and allow an observer to watch the birds feed.

There are bird feeding systems having a tray, platform or collecting device to prevent the feed from falling on the ground when scattered or dropped.

The document US 20090260576 A1 discloses a bird feed catching device which can be attached to a bird feeding system below the feeding station in order to catch the dropped or scattered feed and prevent it from falling to the ground.

However, the bird feed is still accessible to the birds and birds can scatter and drop the feed further while feeding and still prevent vegetation growth beneath the bird feeding system. In addition, some birds like sparrows prefer feeding on the ground and deliberately scatter the feed further in order to eat from the ground. The lost feed not only feeds other vermin, but also means that more feed has to be bought and in turn collected from the ground making it wasteful and/or cumbersome for the bird feeder.

It is therefore an object of the present invention to overcome these disadvantages of the prior art and to present a device so that the feed does not fall onto the ground and/or is available to undesirable animals like rodents and vermin but at the same time allowing birds to be able to feed on the bird feeding system while being observable.

The object is solved by a bird feeding system according to the independent claim.

In particular, the object is solved by a bird feeding system comprising a feed storage container, a feeding station and a tray. The tray collects the scattered or dropped feed and at the same time renders it inaccessible to the birds and comprises a tray member and a separating device.

In use of the bird feeding system the tray covers an area below the feeding station to assure that substantially no scattered or dropped feed can move past it. By making the feed inaccessible to the birds, it is ensured that it does not land on the ground because scattered or dropped feed cannot be scattered, dropped again and fall to the ground. When the feed is scattered on the ground the feed might rot and decompose rendering the feed unusable and producing unpleasant odours.

The vegetation underneath the bird feeding system can grow better without animals scraping through feed debris. Through preventing unwanted animals like rodents to eat this helps to deprive them of food sources and leads to lower populations for the bird feeder.

Furthermore, the system is not wasteful and collects the dropped feed which might be recycled at will without causing much work for the bird feeder. At the same time the scattered or dropped feed does not accumulate on the ground and requires no time consuming cleaning up.

The tray allows collecting the feed making it easily accessible by the bird feeder while at the same time being sheltered against environmental conditions like harsh winds and heavy rain fall.

The tray member and the separating device can be made from a single unit or can be separable from one another. The separating device renders the scattered or dropped feed inaccessible to the birds.

If the tray member and separating device form one unit, bulges and/or narrowing side walls of the tray can make the feed inaccessible to the birds. Since birds cannot fit through narrow wall of the tray or they are hindered by the bulges, the birds are prevented from scattering or dropping the feed further. It would also be conceivable that the tray is too deep so that birds cannot enter it.

A separating device being separable from the tray on the other hand has the advantage that the tray member can be removably attached individually. Thus the collected feed in the tray member is easily accessible by the bird feeder and can be resupplied to the feed storage container or be disposed of.

The bird feeding system, in particular the tray, can comprise at least one bird seating device to enable a bird to sit during feeding. The bird seating device is preferably surrounding the feeding station.

A bird seating device allows the bird to sit while feeding which makes the bird feeding station more appealable. Furthermore, it allows an observer to observe the birds eating.

It is desirable that the tray, comprising a seating device, surrounds the feeding station because the bird then faces the feeding station and the droppings do generally not land on the bird feeding system due to the bird's back turned away from the feeding station in order to access the feed at the feeding station. Therefore, the tray is preferably just large enough that the desired specimen of birds can feed comfortably from the edge of the tray, the edge of the tray being the seating device. This also helps to keep the material costs to a minimum and make the bird feeding system more compact.

Fewer droppings on the bird feeding system in turn require less cleaning effort from the bird feeder and help to minimise the droppings mixing with the scattered or dropped feed in the tray.

The bird feeding system's tray or the tray member can be removably attached to the bottom of the feed storage container and/or the feeding station, preferably using a locking and/or sliding mechanism.

A tray being removably attached or tray member being removably attached allows the bird feeder to access the scattered or dropped feed easily. It is desirable that the tray member in particular is removable because the access to the scattered or dropped feed is not obstructed by the separating device and can be removed or recycled in a more easy way.

It is particularly desirable that the tray or tray member is attached through a locking and/or sliding mechanism because it does not require the bird feeder to be dependent on tools to remove or attach the tray or tray member.

The separating device can be placed in between the feeding station and tray member. The separating device can comprise a funnel member or grid member which is preferably attached to the lower end of the feed storage container and/or feeding station when in use.

A grid member as separating device is particularly well suited to collect the scattered or dropped feed, making it inaccessible to the birds, because a grid member does not require a lot of material. A grid member can thus be produced in an inexpensive way, while at the same time being of very little height when aligned horizontally between the feeding station and tray member. The use of a grid member allows the tray as a whole to be of little height saving further material costs. A grid member could also comprise different materials like wire, plastic, metal or ropes. The openings of the grid are preferably suited to the feed used such that the debris easily fit through the openings but the birds still cannot reach through.

A funnel member can also make the dropped or scattered feed inaccessible to the birds and collect it in the tray.

In a design where collecting in a small compartment or area of the tray is desired, a funnel member is advantageous for collecting scattered or dropped feed.

Attaching the separating device at the lower end of the feed storage container and/or feeding station in between the feeding station and tray member results in a short distance between the feeding station and the separating device. A short distance between the feeding station and separating device helps to ensure that feed cannot easily be scattered or dropped from the bird feeding station and ends up passing through the separating device. The further away from the feeding station the separating is in a vertical direction, the bigger in area it has to be designed in order to collect the debris. Thus in addition to the tray being needed anyway for seating device of the birds further material costs are reduced in contrast to an external separating device for example below the tray member.

It is therefore especially advantageous to place the separating device at least partly, preferably completely, inside the tray member or covering the tray member.

The tray can comprise at least one tray drainage opening configured such that the tray drainage opening allows for water drainage but is too small for feed, husks or shells of feed to pass through. In particular, the tray drainage opening has a diameter of maximum 0.3 cm.

The drainage opening helps to ensure that the scattered and dropped feed does not stay moist or wet due to rain or dew. The drainage opening thus prevents the feed from rotting and the tray from filling with water.

The feeding station can comprise at least one feeding port, preferably four feeding ports, allowing birds access to feed.

The feeding ports provide an opening to the feed storage container, which is wide enough so feed, husks and/or shells do not clog it.

In particular, the feeding port has a diameter or width of 2 cm, whereby feed is preferably resupplied when removed from the feeding port by gravitational force.

In addition, the feeding port comprises a collecting device which renders the feed available to the birds and at least one port drainage opening. The port drainage opening is small enough for water drainage but not large enough for feed to pass through, in particular the port drainage opening has a diameter of maximum 0.3 cm.

The feeding port being wide enough and comprising port drainage openings helps to prevent clogging due to humidity or feed, husks and/or shells interlocking. In addition preventing the feed from getting wet helps to prevent rotting and thus also birds from eating rotten feed and falling ill. It is also advantageous that the port drainage openings are not so large that feed can pass through in order to use as much of the feed possible and not be wasteful.

It is desirable that the feeding port is resupplied with feed by gravitational force because it does not require any effort by the bird feeder and assures that the feed in the feed storage container can be used up completely since the feeding station is stored at the lower end of the feed storage container. The collection device allows the birds to access the feed and provides enough space and boundaries for feed to be resupplied continuously without going to waste.

The bird feeding system can comprise a cover, wherein the cover preferably has a substantially convex shape, wherein the cover is preferably mounted on top of the bird feeding system when in use, more preferably at the top of the feed storage container.

When in use it is advantageous that the bird feeding system can be sheltered by a cover against environmental influences.

The cover helps to protect the bird feeding system from rain and thus prevents the feed from rotting. In addition the protection from rain prevents the feeding station from getting wet. If the feeding station would get wet the feed might clog the feeding ports and hinder feed from being resupplied upon being used up thus rendering the bird feeding system unusable. Furthermore, the cover might offer some shade to the birds making it more comfortable for the birds and attract birds during hot days.

The cover, being preferably mounted on the feed storage container, can simultaneously serve as protective means for the feed storage container which would need to be in place anyway in order to protect the stored feed. Moreover, a cover provides protection from falling victim to a bird of prey and thus makes the birds feel sheltered and might attract more birds.

A substantially convex shape is desirable because it does not require much material and at the same time ensures that no liquid accumulates on top of it and erodes the cover which increases the lifetime of the bird feeding system.

The tray can comprise at least one upper edge, wherein the upper edge of the tray member and the separating device are arranged in a maximum distance of 1.5 cm of one another in vertical direction when in use, preferably with the tray member or separating device encompassing the other.

A maximum distance of 1.5 cm between the upper edge of the tray and the separating device ensures that the height of the tray can be relatively small saving material expenses on one hand. If the distance would be large the tray would have to be deeper in order to still render the feed inaccessible. This maximum height distance allows for an overall compact design that is inexpensive to produce.

On the other hand a small distance between the upper edge of the tray and the separating device is advantageous because the birds can also be sitting on the separating device in addition to the edge of the tray. This allows also small birds to access the feeding station while at the same time granting the advantage of still rendering them visible to an observer due to the low height distance between upper edge of the tray and separating device.

The tray can be horizontally surrounding the feeding station, preferably displaying a circular or elliptical base area, wherein the edge of the tray is bent outwards from the centre of the tray, preferably forming a semicircle, providing a surface for birds to sit or stand on and/or providing access to the feeding station.

A circular or elliptical base area surrounding the feeding station is advantageous because it allows multiple birds from multiple sides to access the feeding station while at the same time still being visible to an observer.

The tray edge being bent outwards is another advantage because this design saves material costs and provides a place for birds to sit or stand without the need for additional devices like perches. In addition the bent edge prevents the tray from being soiled or stained. The dirt and droppings of the birds land only on the curved corners of the tray and not on the sides of the tray, which would be unaesthetic and more cleaning intensive.

The feed storage container can have a cross-section that decreases from top to bottom, preferably by a conical or upper half of an hourglass shape.

The cross-section of the feed storage container is a cross section across the longitudinal axis of the feed storage container. The longitudinal axis extends from the centre top to bottom in a use position.

The cross-section decreasing from top to bottom offers the distinct advantage that more feed can be stored in the bird feeding system while at the same time not having to increase the height. This means that less time is needed to refill the feed storage container and the birds can be fed over a longer period of time while featuring a more efficient design. On the other hand it is advantageous if the feed storage container is designed with a smaller cross-section at its lower end when in use because it leaves the birds enough space to gather around it. Therefore, there is no need of increasing the base are surrounding the feeding station. This saves further material and results in a more compact design.

The feed storage container can be at least partially made from a transparent or semi-transparent material, preferably comprising acrylic, polystyrene, polycarbonate plastic or glass.

On one hand, a transparent or semi-transparent material offers an advantage for the bird feeder because he can see the filling level of the feed storage container.

On the other hand, this design might allow the birds to recognise the provision of feed easier and thus attract more birds.

The bird feeding system can comprise a hanging member, wherein the hanging member can comprise fastening elements to be attached to the cover and/or the feed storage container, preferably through at least one hole in the cover and/or feed storage container, such that the tray is arranged substantially parallel to the ground when in use.

A hanging member has the advantage that it elevates the bird feeding system from the ground and prevents unwanted animals like rodents from access to the bird feed. An elevated position also helps birds to be protected from potential predators like cats and consequently attract more birds. A hanging member is also a very inexpensive method to achieve elevating the bird feeding system from the ground because it needs very few materials like a rope or coated wire and fastening elements. A hanging member also provides means to adjust the bird feeding system's tray parallel to the ground. One way to achieve this would be to mount the hanging member above the centre of gravity of the bird feeding system, so that it automatically aligns with the tray parallel to the ground. Another possibility would be to mount the hanging member on several sides of the bird feeder system, which would allow the bird feeding system to be aligned.

If no means for a hanging member are available an additional pole would be conceivable for the bird feeding system as well.

The cover can be removably connected to the feed storage container, preferably through holes for the hanging member, wherein the cover is preferably slidable along the hanging member, and/or the cover can comprise an opening device, preferably a flap, allowing access to the feed storage for being refilled/emptied.

A cover being removably connected and/or an opening device allow easy access to the feed storage container and makes refilling or emptying it easier for the bird feeder.

A sliding mechanism along the hanging member would be desirable because it offers the advantage of fixing the cover securely in place while at the same time requiring no additional tools to slide it upward and refill the feed storage container.

Additionally, it would also be conceivable that the cover is only held at its place by the hanging member and fastening means and gravity.

The tray, cover and/or feeding station can comprise non-porous semi rigid or rigid plastic, metal, glass and/or wood.

The bird feeding system needs to able to withstand environmental conditions for long time periods. At the same time the used materials should be inexpensive and easy to manufacture.

Non-porous semi rigid or rigid plastic, metal, glass and/or wood fulfil these features and are therefore advantageous to be used in the bird feeding system.

In the following embodiments of the invention are described in detail in figures.

FIG. 1: Depicts a bird feeding system according to the invention in side view, FIG. 2: Depicts a bird feeding system according to the invention in a perspective side view, FIG. 3: Depicts a bird feeding system according to the invention in a perspective side view, FIG. 4: Depicts a bird feeding system according to the invention in a perspective top view.

Identical reference signs in the figure indicate identical components.

FIG. 1 shows a bird feeding 1 system according to the invention with a hanging member 3, fastening elements 4, a cover 2, a feed storage container 5, a feeding station 6, a tray 9 comprising a tray member 11, and several feeding ports 7. The bird feeding system is displayed in the upright position which is also the position of intended use. The bird feeding system 1 can be attached by using the hanging member 3 which is attached to the cover 2, consisting of polystyrene plastic, and feed storage container 5, which is made from acrylic glass, through fastening elements 4.

The fastening elements 4 are realised through a hole in the cover 2 and bulges with holes of the feed storage container 5.

The hanging member 3 is made from a vinyl coated stainless steel cable. The use of a chain could also be envisaged as a hanging member in a different version. The bird feeding system 1 can be attached to a raised position, such as a branch, by a loop of the hanging member 3 or by knotting. The cover 2 has a convex shape that protects the birds and feed from environmental influences and displays a spherical segment with the radius of the base circle being approximately 10 cm. The maximum radius of the tray's 9 tray member 11 base area is also approximately 10 cm. Furthermore, the side of the tray is bent inward forming an edge, granting further stability against deformation, and in addition featuring a rounded edge at the side's bottom.

As illustrated in FIG. 1 the feed storage container 5 has a greater cross-section at the top in order to offer a maximum amount of storage space for feed while still being compact.

At the lower end of the feed storage container 5 the base area cross-section decreases conically to make space for birds to access the feeding station 6 with the four feeding ports 7 which are attached at the very bottom of the feed storage container.

The edge of the tray 9 is bent forming a semi-circle in order to serve as seating device 14 for the birds. In addition to seating device 14 the rounded edge serves as provision that the birds do not soil the side wall of the tray.

Figure 2:
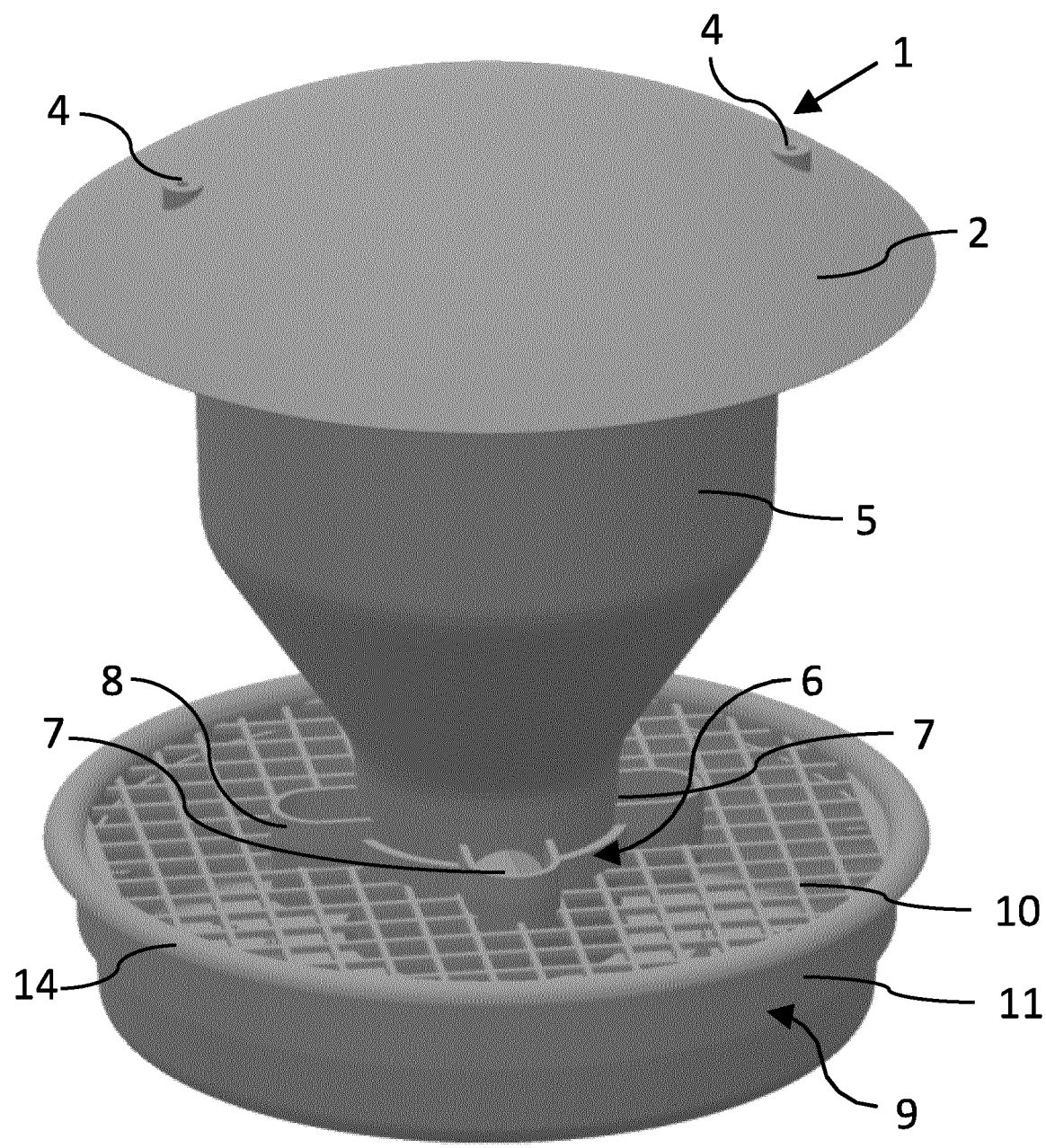

FIG. 2 shows the bird feeding system from a perspective side view. FIG. 2 shows that feeding ports 7 of the feeding station 6 comprise a collecting device 8 which is automatically supplied by gravitational force with feed through an opening of the feeding port 7 which is wide enough so feed, husks and/or shells do not clog it. Even if they were clogged by feed or wetted feed the birds could still feed since the feeding station is equipped with four feeding ports 7. In particular, the feeding port's opening has a width of 2 cm and comprises a collecting device 8 which is composed of two straight side walls leading substantially radially away from the feed storage container 5 connected to one another by a wall forming a semi-circle, the distance between the side walls being 2 cm.

Moreover, FIG. 2 shows that the tray 9 comprises a tray member 11 and a separating device 10 which are both made from a plastic material. In this version the separating device 10 is a grid having a large enough mesh-size in order for feed to pass through if scattered or dropped and is placed inside the tray member 11. The mesh size is in particular of size 1 cm. The tray member 11 is deep enough so that birds cannot reach the feed through the grid of the separating device 10 and the food is rendered inaccessible for the birds once passed through.

The separating device 10 is fixedly connected to the feeding station 6 but the tray member 11 is only removably attached with a locking mechanism to the feeding station 6, to be detached and emptied easier.

The edge of the tray 9 and the surface formed by the grid of the separating device 10 serves as means for the birds to sit and feed. The edge of the tray 9 is shaped in semi-circle outward in order to serve as seating device 14 for birds similar to a perch around the feeding station. The tray 9 has a circular base area which surrounds the feeding station which allows multiple birds to access the feeding station being seated at the same distance from the bird feeding station 1.

Figure 3:
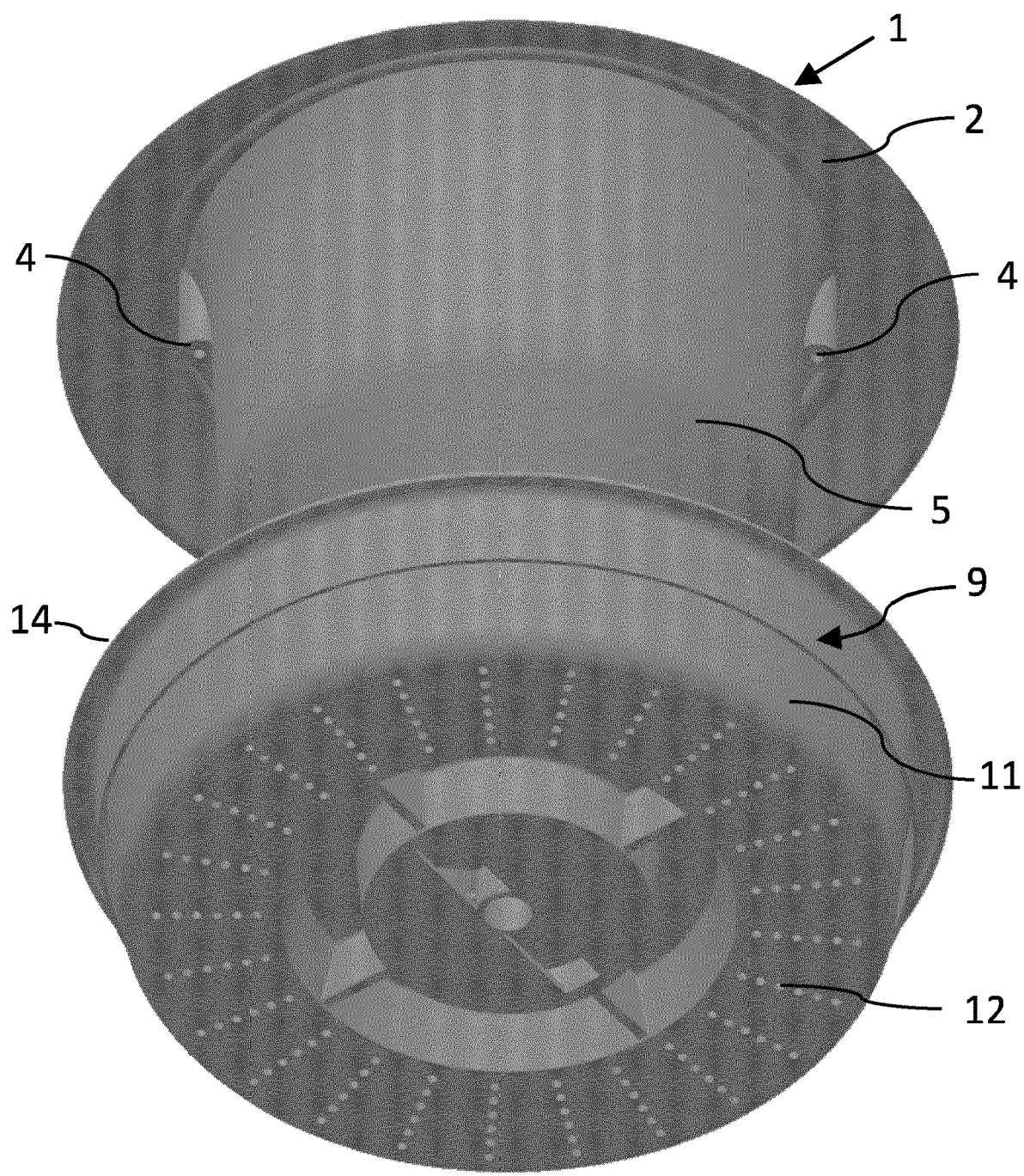

FIG. 3 shows the bottom of the bird feeding station 1 in a perspective side view showing the cover 2 the fastening elements 4, the feed storage container 5, the tray 9 and the tray member 11 and tray drainage openings 12.

The tray 9 is equipped with multiple tray drainage openings 12 which make sure that no water accumulates in the tray and the dropped feed in the tray does not rot nor fall to the ground. The tray drainage openings 12 essentially are of a size of 0.3 cm and aligned along lines outward from the centre of the tray.

This embodiment of the bird feeding system 1 shows a conical elevation upwards in the middle of the tray member 11 which is supported by four cross bracings. The cross bracings help to increase tractions and assist in removing the tray in turning it relative to the separating device by essentially 45°, wherein releasing a latch. This conical elevation ends in a plateau which is used to receive the feeding station and connects to it through a locking mechanism. FIG. 3 also shows the conical shape of the tray 9 with bent upper edge serving as seating device 14 for the birds.

Figure 4:
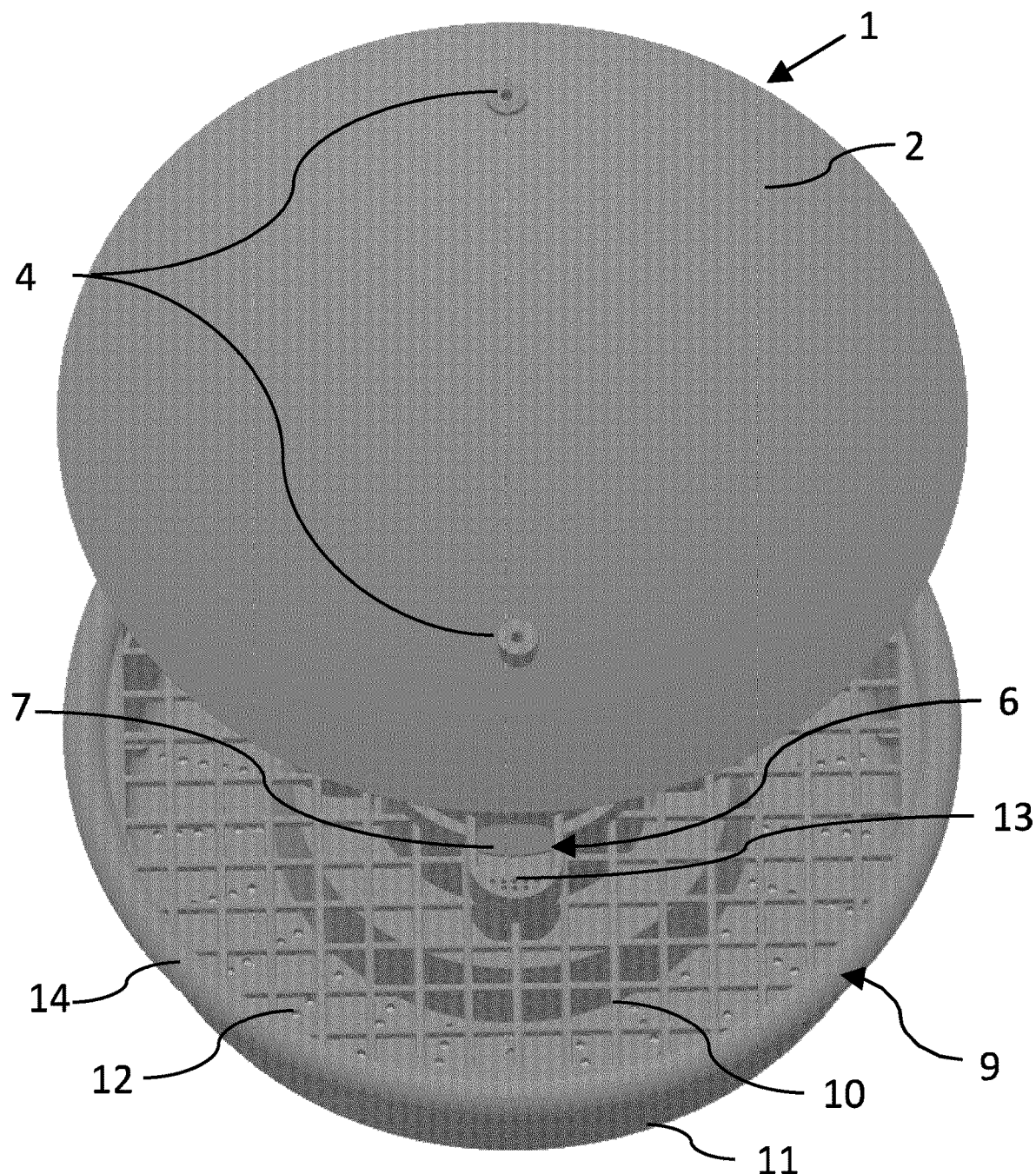

FIG. 4 shows the bird feeding system 1 from a perspective top view with the protective cover 2 on top equipped with 2 fastening elements for receiving and fastening the hanging member 3 (see FIG. 1) and the feeding station 6 comprising a feeding port 7 which comprises port drainage openings 13. The port drainage openings 13 allow water to be drained from the feeding port 7 but are too small for feed to pass through. This prevents the clogging of the feeding port's opening through wet feed and it serves to retain the feed edible.

FIG. 4 also features the conical elevation of the tray member's middle which forms a flat surface to receive a locking connection to the feeding station 6 and at the same time grants stability to the tray member 11.

FIG. 4 also shows the tray 9 comprising the separating device 10 and tray member 11 featuring the tray drainage openings 12 of the tray member 11. The grid of the separating device 10 and the seating device 14 can both allow birds to sit and rest and/or access the feeding station.

The invention claimed is:

1. A bird feeding system comprising a bird feed storage container, a feeding station, and a tray for collecting feed scattered or dropped from the feeding station, wherein the tray renders the feed scattered or dropped from the feeding station inaccessible to the birds, wherein the tray comprises a tray member and a separating device, wherein the separating device is placed in between the feeding station and the tray member, wherein the feeding station comprises at least one feeding port, wherein the at least one feeding port provides an opening to the feed storage container, and the at least one feeding port comprises a collecting device which renders the feed available to the birds and at least one port drainage opening, wherein the tray comprises at least one tray drainage opening configured such that the tray drainage opening allows for water drainage, wherein the separating device is fixedly attached to a lower end of the feed storage container and/or the feeding station, the separating device being separable from the tray such that the tray member can be removably attached individually, wherein the tray member collects scattered feed and is removably attached to a bottom of the feed storage container and/or the feeding station, the tray member when attached to the bottom of the feed storage container and/or the feeding station being removable from the bottom of the feed storage container and/or the feeding station by being turned relative to the separating device such that there is no need of dismantling other elements of the bird feeding system and no feed is caused to spill from the feed storage container when removing the tray member.

2. The bird feeding system according to claim 1, wherein the separating device renders the scattered or dropped feed inaccessible to the birds.

3. The bird feeding system according to claim 1, wherein the tray comprises at least one bird seating device to enable a bird to sit during feeding, the bird seating device surrounding the feeding station.

4. The bird feeding system according to claim 1, wherein the separating device comprises a funnel member or grid member.

5. The bird feeding system according to claim 1, wherein the tray member is removably attached to the bottom of the feed storage container and/or the feeding station using a locking and/or sliding mechanism.

6. The bird feeding system according to claim 1, wherein the at least one tray drainage opening is too small for feed, husks or shells of feed to pass through, in particular the tray drainage opening has a diameter of maximum 0.3 cm.

7. The bird feeding system according to claim 1, wherein the feeding station is placed substantially in the lower third of the feed storage container when in use and wherein the at least one feeding port allows birds to access feed, wherein the at least one feeding port is wide enough so feed, husks and/or shells do not clog it, in particular the at least one feeding port has a diameter of 2 cm, whereby feed is resupplied when removed from the at least one feeding port by gravitational force, and wherein the port drainage opening is small enough for water drainage but not large enough for feed to pass through, in particular the port drainage opening has a diameter of maximum 0.3 cm.

8. The bird feeding system according to claim 1, wherein the bird feeding system comprises a cover, wherein the cover has a substantially convex shape, wherein the cover is mounted on top of the bird feeding system when in use.

9. The bird feeding system according to claim 1, wherein the tray comprises at least one upper edge, wherein the upper edge of the tray member and the separating device are arranged in a maximum distance of 1.5 cm of one another in a vertical direction when in use with the tray member or separating device encompassing the other.

10. The bird feeding system according to claim 1, wherein the tray is horizontally surrounding the feeding station, displaying a circular or elliptical base area, wherein the edge of the tray is bent outwards from the centre of the tray forming a semicircle, providing a surface for birds to sit or stand on and/or providing access to the feeding station.

11. The bird feeding system according to claim 1, wherein the feed storage container has a cross-section that decreases from top to bottom by a conical or upper half of an hourglass shape.

12. The bird feeding system according to claim 1, wherein the feed storage container is at least partially made from a transparent or semi-transparent material comprising glass or acrylic glass.

13. The bird feeding system according to claim 1, wherein the bird feeding system comprises a hanging member, wherein the hanging member comprises fastening elements to be attached to the cover and/or the feed storage container through at least one hole in the cover and/or feed storage container, such that the tray is arranged substantially parallel to the ground when in use.

14. The bird feeding system of claim 1 wherein the cover is removably connected to the feed storage container through holes for the hanging member, wherein the cover is slidable along the hanging member, and/or the cover comprises an opening device allowing access to the feed storage for being re-filled/emptied.

15. The bird feeding system of claim 1 wherein the tray, cover and/or feeding station comprises non-porous semi rigid or rigid plastic, metal, glass and/or wood.

16. The bird feeding system of claim 1, wherein the feeding station comprises four feeding ports.

* * * * *